(12) United States Patent
Taguchi et al.

(10) Patent No.: US 9,625,856 B2
(45) Date of Patent: Apr. 18, 2017

(54) CARTRIDGE INCLUDING AGITATOR THEREIN

(71) Applicant: Brother Kogyo Kabushiki Kaisha, Nagoya-shi, Aichi-ken (JP)

(72) Inventors: Kazuna Taguchi, Nagoya (JP); Yasuo Fukamachi, Nagoya (JP); Motoaki Mushika, Hashima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/845,368

(22) Filed: Sep. 4, 2015

(65) Prior Publication Data

US 2016/0223949 A1 Aug. 4, 2016

(30) Foreign Application Priority Data

Jan. 30, 2015 (JP) ................. 2015-017793

(51) Int. Cl.
*G03G 15/08* (2006.01)
*B65G 33/32* (2006.01)

(52) U.S. Cl.
CPC ........ *G03G 15/0889* (2013.01); *B65G 33/32* (2013.01); *G03G 15/0891* (2013.01); *G03G 15/0896* (2013.01); *G03G 2215/085* (2013.01); *G03G 2215/0827* (2013.01)

(58) Field of Classification Search
CPC ........... G03G 15/0822; G03G 15/0887; G03G 15/0889; G03G 15/0891; G03G 15/0896; G03G 21/1821; G03G 2215/0802; G03G 2215/0827; G03G 2215/085; B65G 33/32

USPC .................. 399/254, 256; 198/672
See application file for complete search history.

(56) References Cited

U.S. PATENT DOCUMENTS

| | | | |
|---|---|---|---|
| 2006/0204282 A1* | 9/2006 | Yoshida et al. | 399/254 |
| 2006/0238599 A1 | 10/2006 | Kishi et al. | |
| 2010/0111572 A1* | 5/2010 | Hori et al. | 399/260 |
| 2010/0129110 A1* | 5/2010 | Kawaguchi | 399/104 |

FOREIGN PATENT DOCUMENTS

| | | |
|---|---|---|
| JP | 2006-078992 A | 3/2006 |
| JP | 2006-317754 A | 11/2006 |
| JP | 4581577 B2 | 11/2010 |

* cited by examiner

*Primary Examiner* — Benjamin Schmitt
(74) *Attorney, Agent, or Firm* — Banner & Witcoff, Ltd.

(57) ABSTRACT

A cartridge includes a casing, a developing roller, and an agitator. The casing is configured to accommodate developing agent. The casing has a first wall and a second wall disposed away from the first wall in a first direction. The agitator includes a rotational shaft and an agitating blade. The rotational shaft extends in the first direction and has a first end portion. The first end portion defines a circumferential surface and is supported to the first wall. The rotational shaft is configured to rotate in a rotating direction about a rotational center. The first wall has a concave portion having a plurality of protruding portions extending toward the circumferential surface and arranged at intervals from each other in the rotating direction. The agitating blade is positioned between the first end portion and the second end portion in the first direction and extending in the radial direction.

14 Claims, 11 Drawing Sheets

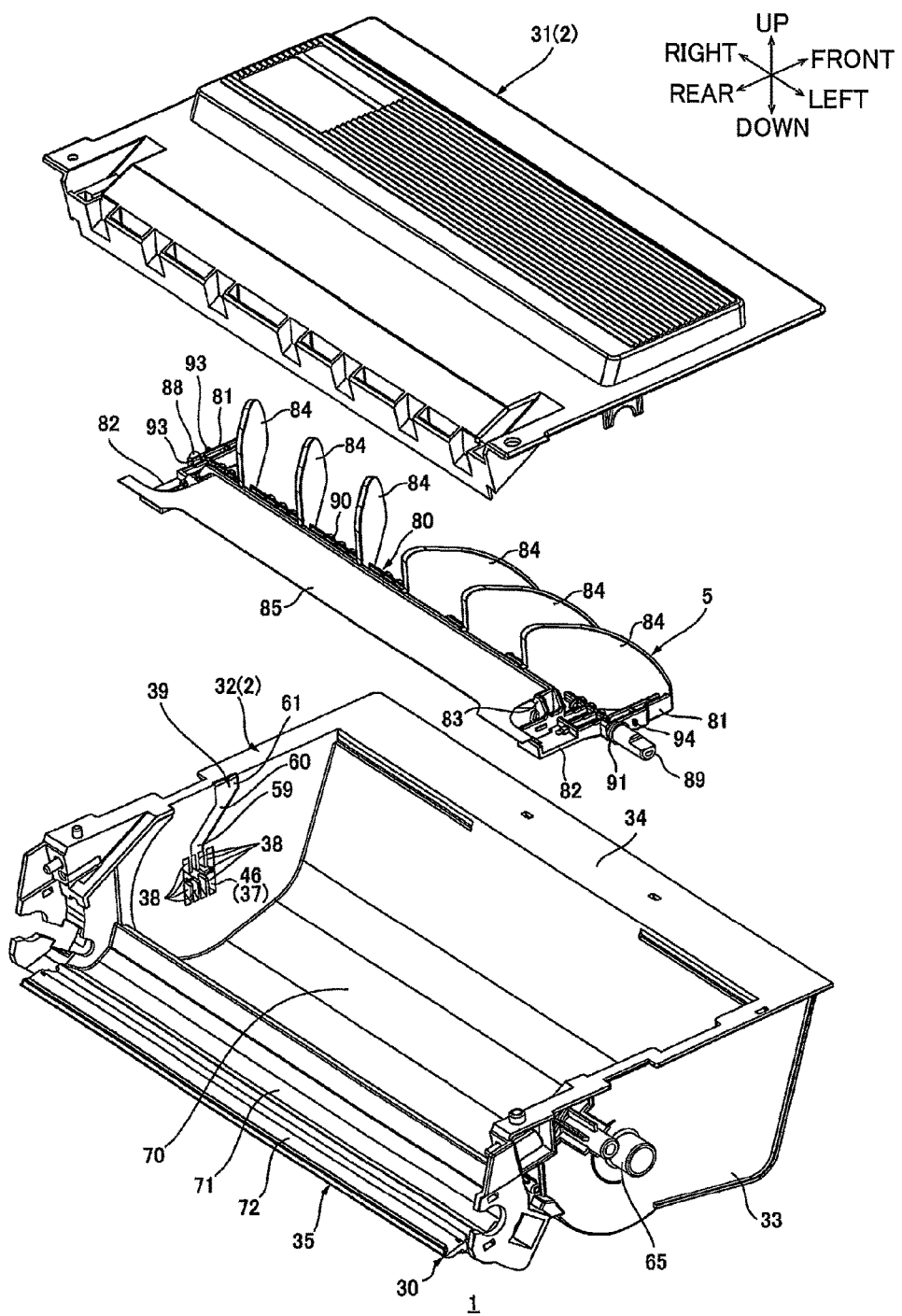

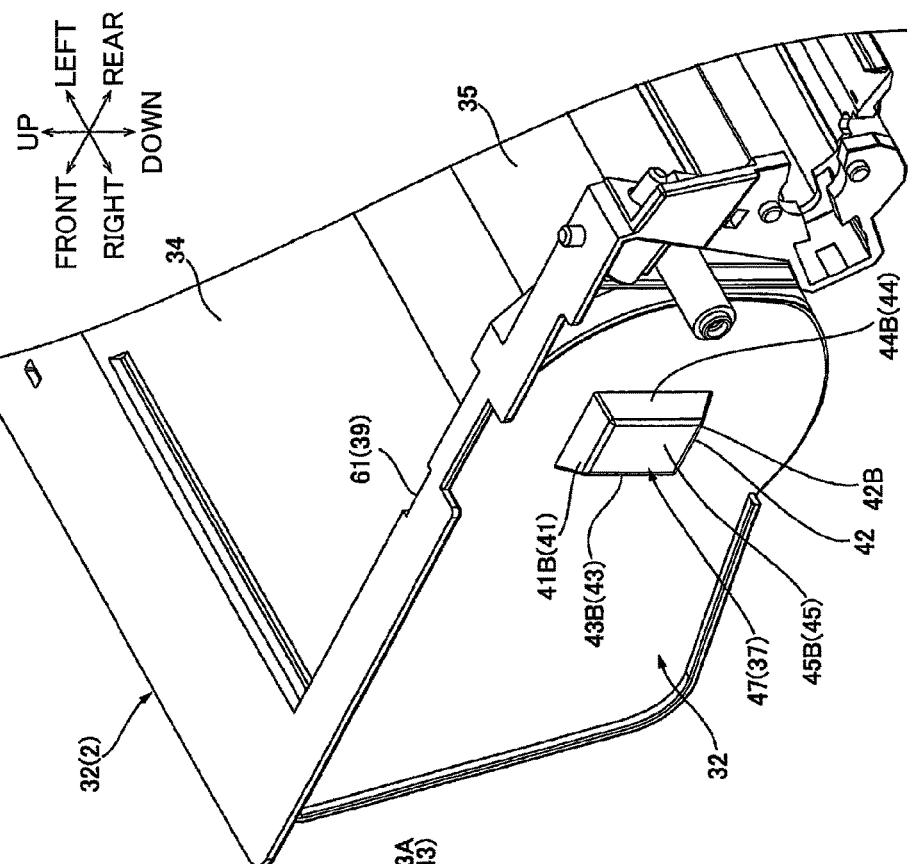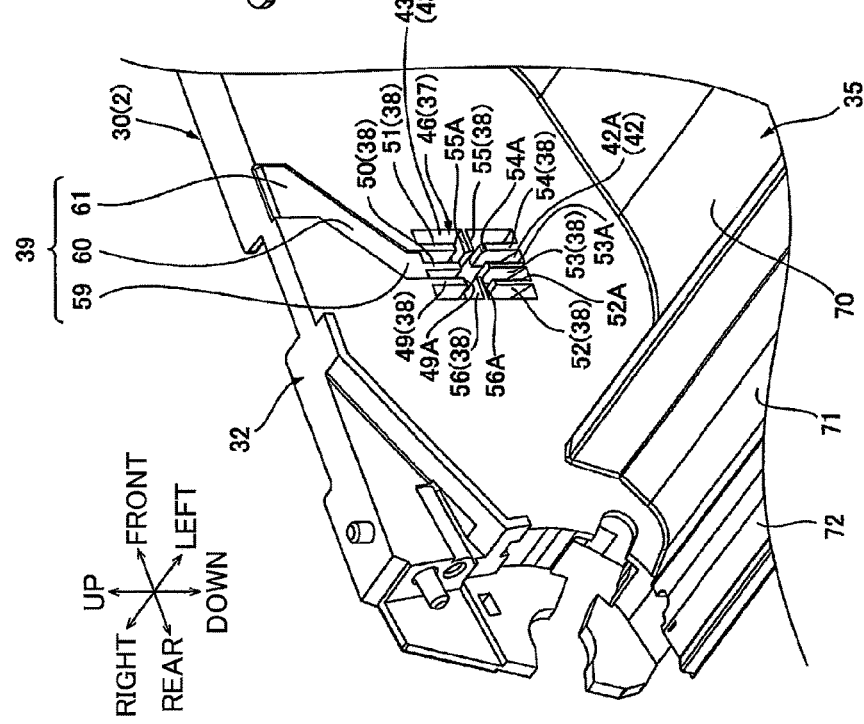

CARTRIDGE INCLUDING AGITATOR THEREIN

CROSS REFERENCE TO RELATED APPLICATION

This application claims priority from Japanese Patent Application No. 2015-017793 filed Jan. 30, 2015. The entire content of this priority application is incorporated herein by reference.

TECHNICAL FIELD

The present disclosure relates to a cartridge to be assembled in an electro-photographic type image forming apparatus.

BACKGROUND

A developing cartridge attachable to and detachable from an electro-photographic type image forming apparatus is known in the art. Such a conventional developing cartridge includes a developing agent accommodating chamber for accommodating therein toner, and an agitator for agitating the toner in the accommodating chamber.

Japanese Patent Application Publication No. 2006-317754 discloses a developing cartridge in which an agitator shaft is held by a holding portion provided at an inner wall of the accommodating chamber so that the agitator is rotatable about an axis of the shaft.

SUMMARY

The Present inventors have found that according to the disclosed developing cartridge, since the holding portion is recessed outward from the inner wall for receiving the agitator shaft, toner may be entered into a gap between the holding portion and the agitator shaft, and the toner may be retained at the gap. Upon rotation of the agitator, the toner retained in the gap may be melted due to frictional heat, and may be adhered to or immobilized at the holding portion.

In view of the foregoing, it is an object of the disclosure to provide a cartridge capable of reducing retention of toner at a grooved or recessed portion in which the rotation shaft of the agitator is received.

In order to attain the above and other objects, the disclosure provides a cartridge including a casing, a developing roller, and an agitator. The casing is configured to accommodate developing agent. The casing has a first wall and a second wall disposed away from the first wall in a first direction. The agitator includes a rotational shaft and an agitating blade. The rotational shaft extends in the first direction and has a first end portion and a second end portion. The first end portion defines a circumferential surface and is supported to the first wall. The second end portion is supported to the second wall. The rotational shaft is configured to rotate in a rotating direction about a rotational center and defines a radial direction perpendicular to the first direction. The first wall has a concave portion recessed away from the second wall in the first direction so as to receive the first end portion. The concave portion has a plurality of protruding portions extending toward the circumferential surface and arranged at intervals from each other in the rotating direction. The agitating blade is positioned between the first end portion and the second end portion in the first direction and extending in the radial direction.

BRIEF DESCRIPTION OF THE DRAWINGS

The particular features and advantages of the embodiment(s) as well as other objects will become apparent from the following description taken in connection with the accompanying drawings, in which:

FIG. 4 is an exploded perspective view of the developing cartridge illustrated in FIG. 3;

FIG. 5A is a partial perspective view of the developing cartridge, particularly illustrating a right wall thereof as viewed from left and diagonally rear side of the cartridge;

FIG. 5B is a partial perspective view of the developing cartridge, particularly illustrating a right wall thereof as viewed from right and diagonally rear side of the cartridge;

DETAILED DESCRIPTION

A developing cartridge as a cartridge according to a first embodiment will be described with reference to FIGS. 1 through 10B.

1. Outline of Developing Cartridge

Figure 1:
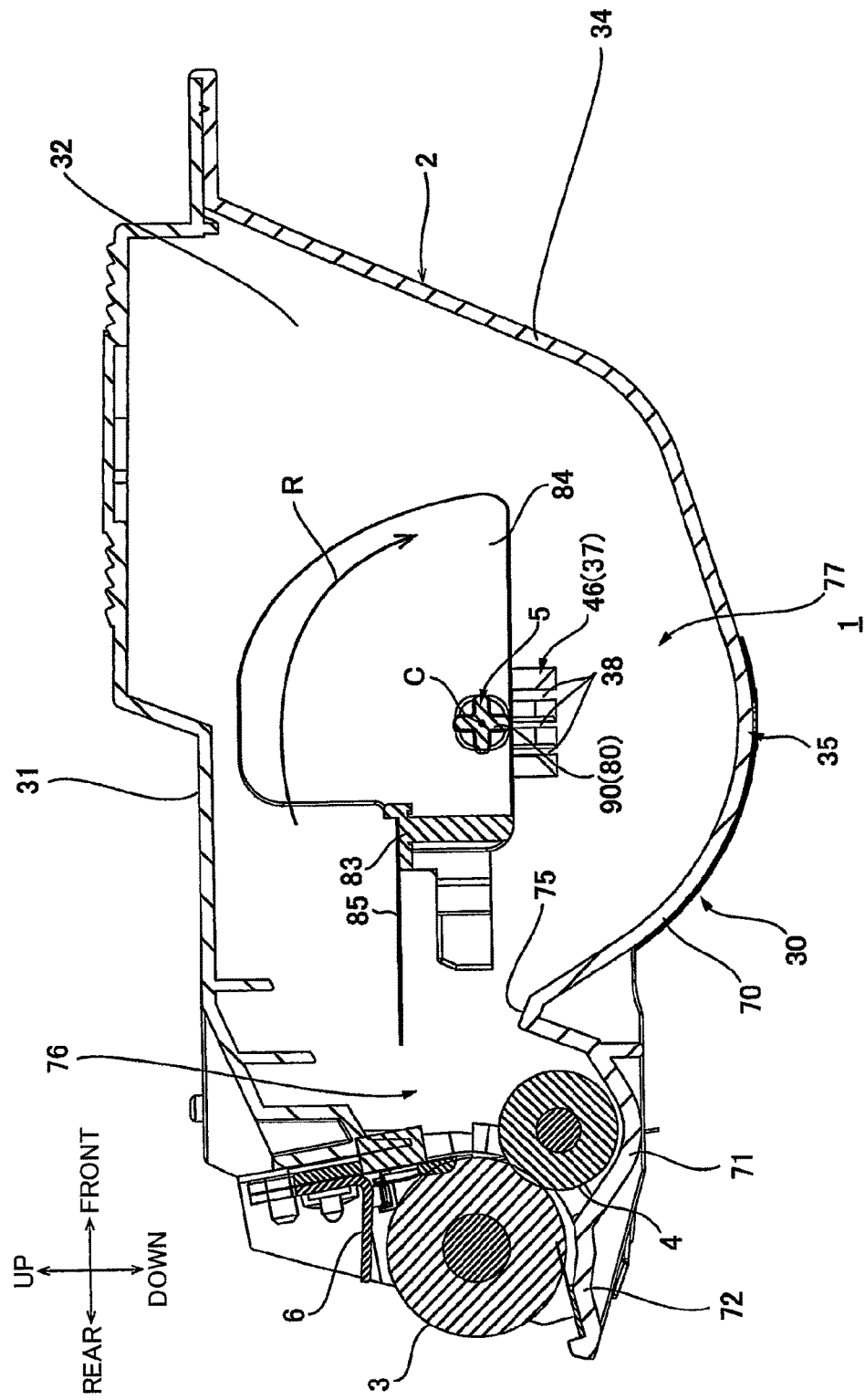
FIG. 1 is a cross-sectional view of a center portion of a developing cartridge according to a first embodiment.

As illustrated in FIG. 1, a developing cartridge 1 includes a developing frame 2 as an example of a casing, a developing roller 3, a supply roller 4, an agitator 5, and a thickness regulation blade 6.

Regarding directions in the following description, a side of the developing roller 3 relative to the agitator 5 will be referred to as "rear side", and a side opposite to the rear side will be referred to as "front side". Further, a side of a cover frame 31 with respect to the agitator 5 will be referred to as "upper side", and a side opposite to the upper side will be referred to as "lower side". Further, "left side" and "right side" are determined when viewing the developing cartridge 1 from the front side. These directions are indicated in each Figure. Incidentally, the "left-right direction" is an example of a first direction and an axial direction, and "vertical direction" is an example of a second direction.

The developing frame 2 is generally box shaped, extending in the left-right direction. The frame 2 has a rear end portion opened in the front-rear direction. The developing frame 2 is configured to accommodate therein toner as an example of developing agent.

The developing roller 3 is positioned in the developing frame 2 at a rear end portion thereof. The developing roller 3 extends in the left-right direction and is generally cylindrical. A rear portion of the developing roller 3 is exposed to an outside through the opening of the developing frame 2.

The supply roller 4 is positioned in the developing frame 2 at a position frontward and diagonally downward of the developing roller 3. The supply roller 4 extends in the left-right direction and is generally cylindrical. The supply roller 4 is rotatably supported to the developing frame 2. The supply roller 4 has a rear diagonally upper portion in contact with a front diagonally lower portion of the developing roller 3.

The agitator 5 is positioned within the developing frame 2 at a front portion thereof and frontward of the supply roller 4. The agitator 5 is supported to the developing frame 2 and rotatable in the clockwise direction in a left side view about a rotation center C. This rotating direction of the agitator 5 will be referred to as a rotating direction R.

The thickness regulation blade 6 is positioned frontward and diagonally above the developing roller 3, and is fixed to the developing frame 2. The thickness regulation blade 6 has a lower end portion in contact with a front end portion of the developing roller 3.

2. Overall Structure of Printer

Figure 2:
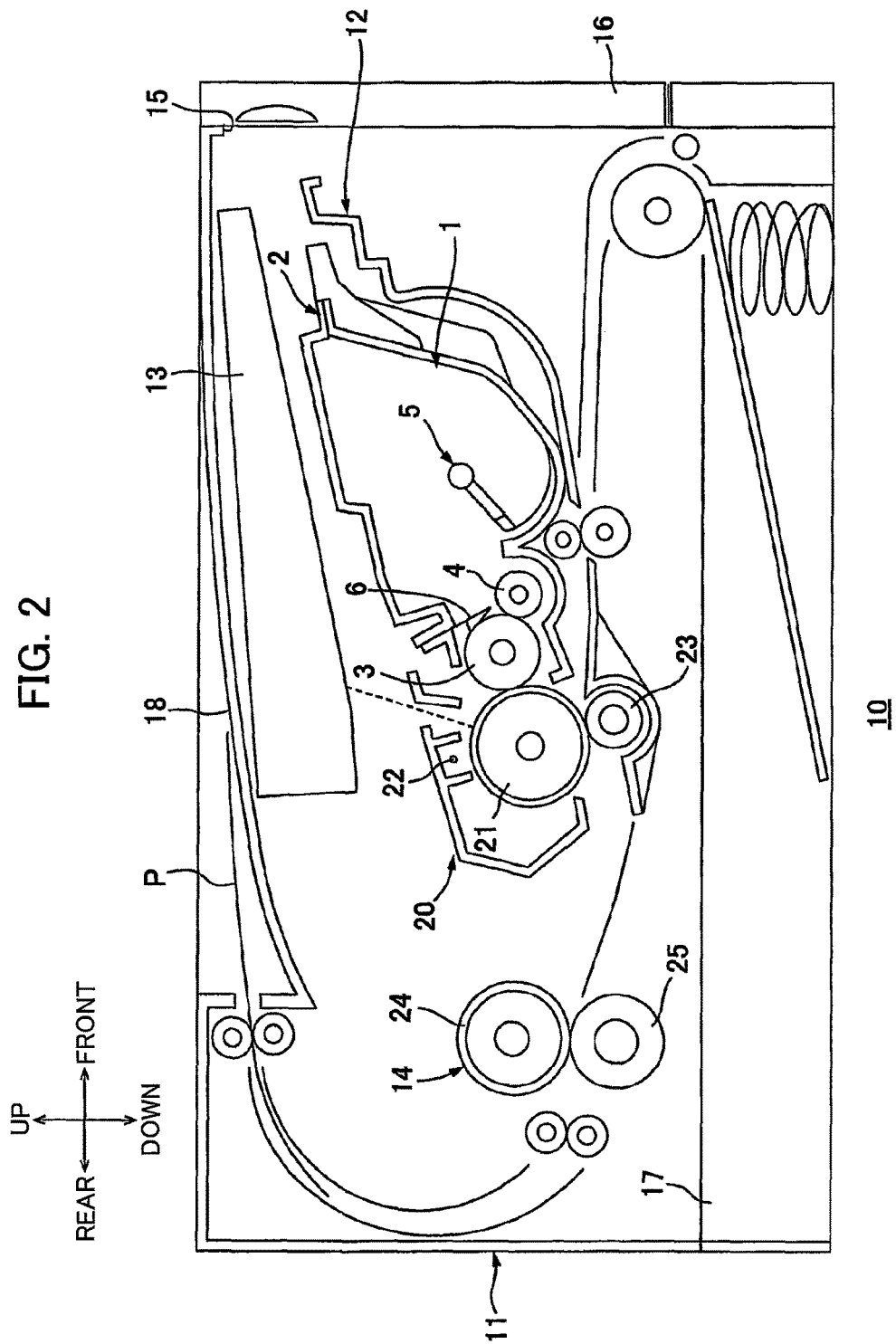
FIG. 2 is a schematic cross-sectional view of a center portion of an image forming apparatus in which the developing cartridge illustrated in FIG. 1 is assembled.

As illustrated in FIG. 2, the developing cartridge 1 is installed in a printer 10.

The printer 10 is an electro-photographic type monochromatic printer, and includes a housing 11, a process cartridge 12, a scanner unit 13, and a fixing unit 14.

The housing 11 has a general box shape whose front end is formed with an opening 15. The housing 11 includes a front cover 16, a sheet tray 17, and a discharge tray 18. The opening 15 allows communication between outside and inside of the housing 11 in the front-rear direction, so that the process cartridge 12 can pass through the opening 15.

The front cover 16 is provided at the front end portion of the housing 11 and is generally plate-shaped. The front cover 16 is configured to open and close the opening 15.

The sheet tray 17 is positioned at a bottom portion of the housing 11 and is configured to accommodate sheets P.

The discharge tray 18 is provided at an upper wall of the housing 11.

The process cartridge 12 is configured to be accommodated at a vertically center portion in the housing 11. The process cartridge 12 can be attached to and detached from the housing 11 through the opening 15. The process cartridge 12 includes a drum cartridge 20 and the developing cartridge 1.

The drum cartridge 20 includes a photosensitive drum 21, a scorotron charger 22, and a transfer roller 23.

The photosensitive drum 21 is positioned at a rear end portion of the drum cartridge 20. The photosensitive drum 21 is a generally hollow cylinder extending in the left-right direction, and is rotatably supported to a frame of the drum cartridge 20.

The scorotron charger 22 is positioned above the photosensitive drum 21, and is spaced away therefrom.

The transfer roller 23 is positioned below the photosensitive drum 21 and is a general cylinder extending in the left-right direction. The transfer roller 23 is rotatably supported to the frame of the drum cartridge 20. The transfer roller 23 has an upper end portion in contact with a lower end portion of the photosensitive drum 21.

The developing cartridge 1 is attachable to and detachable from the drum cartridge 20. The developing cartridge 1 is positioned frontward of the photosensitive drum 21 when the developing cartridge 1 is attached to the drum cartridge 20. The developing roller 3 of the developing cartridge 1 is in contact with a front end portion of the photosensitive drum 21 in the assembled state.

The scanner unit 13 is positioned above the process cartridge 12, and is adapted to emit laser beam based on image data to the photosensitive drum 21.

The fixing unit 14 is positioned rearward of the process cartridge 12, and includes a heat roller 24 and a pressure roller 25 in pressure contact with a lower end portion of the heat roller 24.

Upon start of the image forming operation in the printer 10, the scorotron charger 22 uniformly charges the surface of the photosensitive drum 21 and the surface of the photosensitive drum 21 is exposed to light outputted by the scanner unit 13. Thus, an electrostatic latent image based on the image data is formed on the surface of the photosensitive drum 21.

The agitator 5 agitates toner in the developing frame 2 and supplies toner to the supply roller 4. The supply roller 4 supplies toner that has been supplied by the agitator 5 to the developing roller 3. In this case, triboelectric charging is performed between the developing roller 3 and the supply roller 4 so that the toner is charged with positive polarity. The toner is then carried on the developing roller 3. The thickness regulation blade 6 regulates thickness of a layer of the toner carried on the developing roller 3 into a uniform thickness.

The toner carried on the developing roller 3 is supplied to the electrostatic latent image on the photosensitive drum 21. Thus a toner image is carried on the surface of the photosensitive drum 21.

Each sheet P is supplied from the sheet tray 17 to a position between the photosensitive drum 21 and the transfer roller 23 at a prescribed timing by the rotation of rollers. Toner image carried on the surface of the photosensitive drum 21 is transferred onto the sheet P when the sheet P passes through a position between the photosensitive drum 21 and the transfer roller 23.

Thereafter, the sheet P is heated and pressed when the sheet passes through a position between the heat roller 24 and the pressure roller 25. Thus, the toner image on the sheet P is thermally fixed to the sheet P. Then, the sheet P is discharged onto the discharge tray 18.

3. Details of Developing Frame

Figure 3:
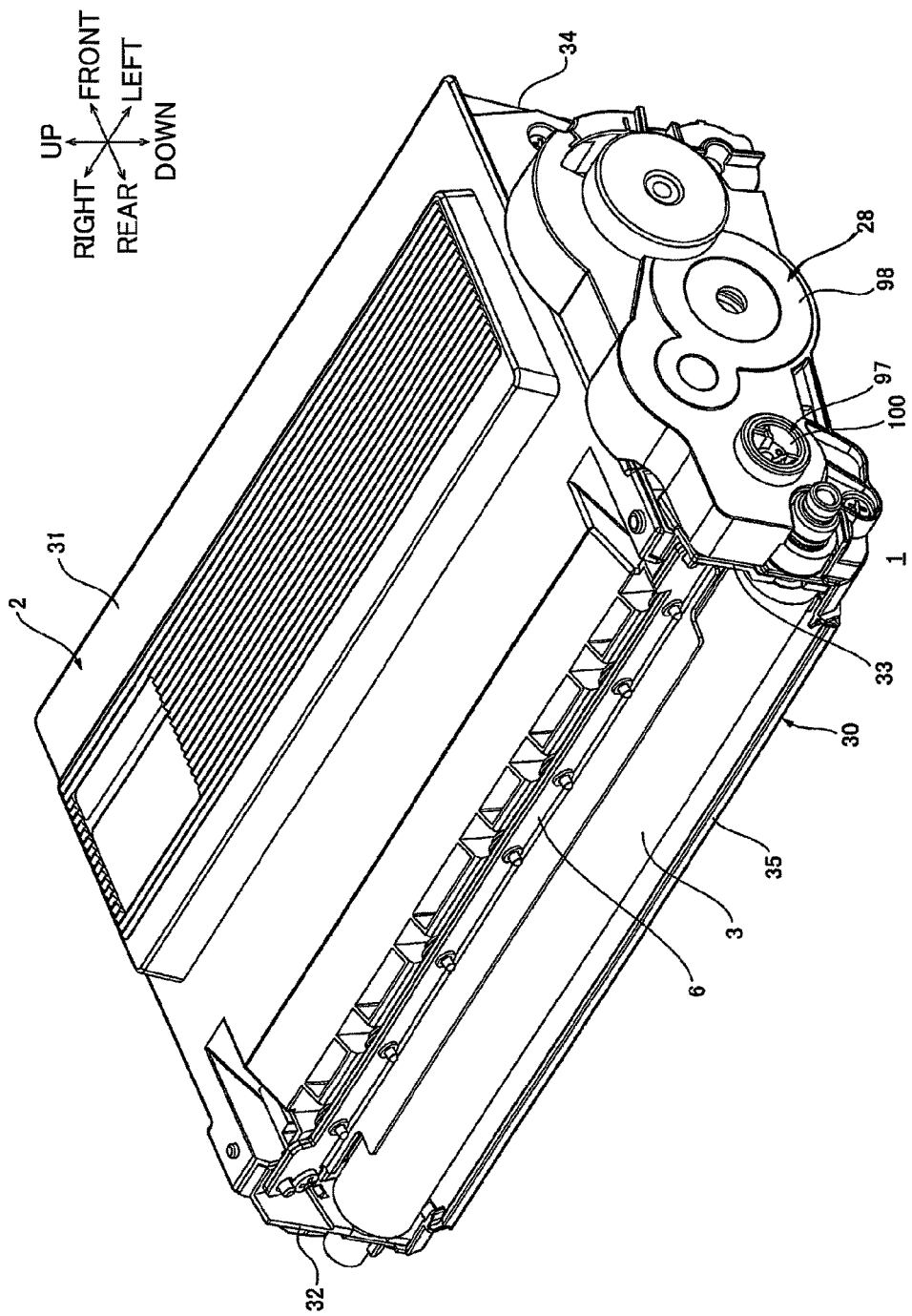
FIG. 3 is a perspective view of the developing cartridge illustrated in FIG. 1 and as viewed from rear and diagonally upper side of the cartridge.

The developing cartridge 1 further includes a drive unit 28 as illustrated in FIG. 3 in addition to the above-described developing frame 2 and the agitator 5.

(1) Developing Frame

As shown in FIGS. 1 and 3, the developing frame 2 includes a base frame 30 as an example of a first frame, and a cover frame 31 as an example of a second frame.

As shown in FIG. 4, the base frame 30 includes a right wall 32 as an example of a first wall, a left wall 33 as an example of a second wall, a front wall 34, and a bottom wall 35.

The right wall 32 constitutes the right side of the base frame 30. The right wall 32 has a plate-like shape that is generally rectangular in a side view and elongated in the front-rear direction. The right wall 32 includes a bulged part 37, eight protruding parts 38 as examples of protruding portions, and a guide part 39 as an example of a guide portion.

As shown in FIGS. 5A and 5B, the bulged part 37 is disposed in the approximate center of the right wall 32 when viewed from the side. The bulged part 37 has a general squared cylindrical shape that is closed on the right side. The bulged part 37 protrudes rightward from the right wall 32 while tapering toward the right. In a plan view and a front view, the bulged part 37 has a general trapezoidal shape. More specifically, the bulged part 37 includes a first wall 41, a second wall 42, a third wall 43, a fourth wall 44, and a fifth wall 45.

Figure 8:
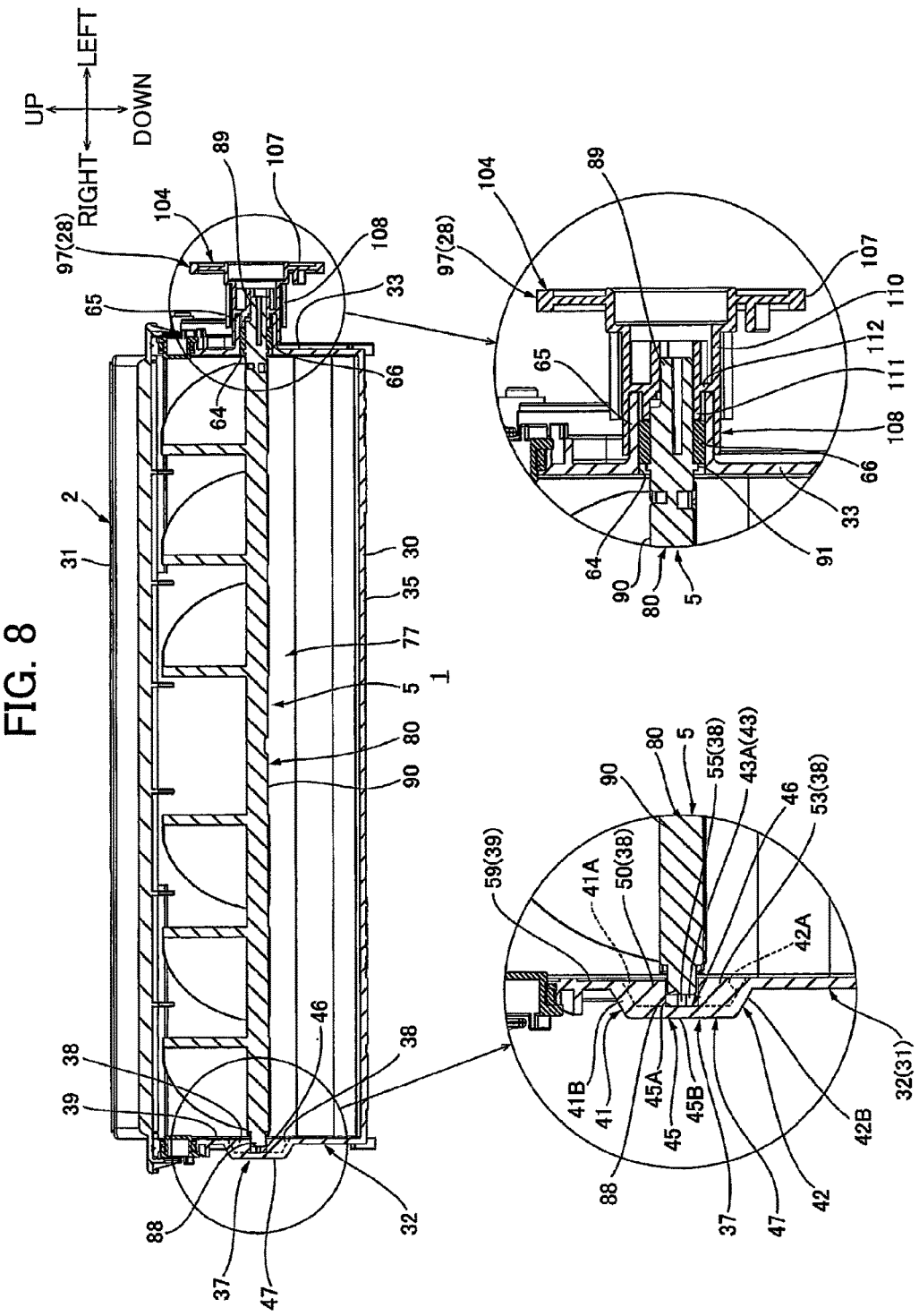
FIG. 8 is a cross-sectional view of the developing cartridge taken along a line A-A in FIG. 7.

As shown in FIGS. 5B and 8, the first wall 41 forms the top wall of the bulged part 37. The first wall 41 has a general plate shape that slopes downward from the right wall 32 toward the right.

The second wall 42 forms the bottom wall of the bulged part 37. The second wall 42 has a general plate shape that slopes upward from the right wall 32 toward the right.

Figure 9:
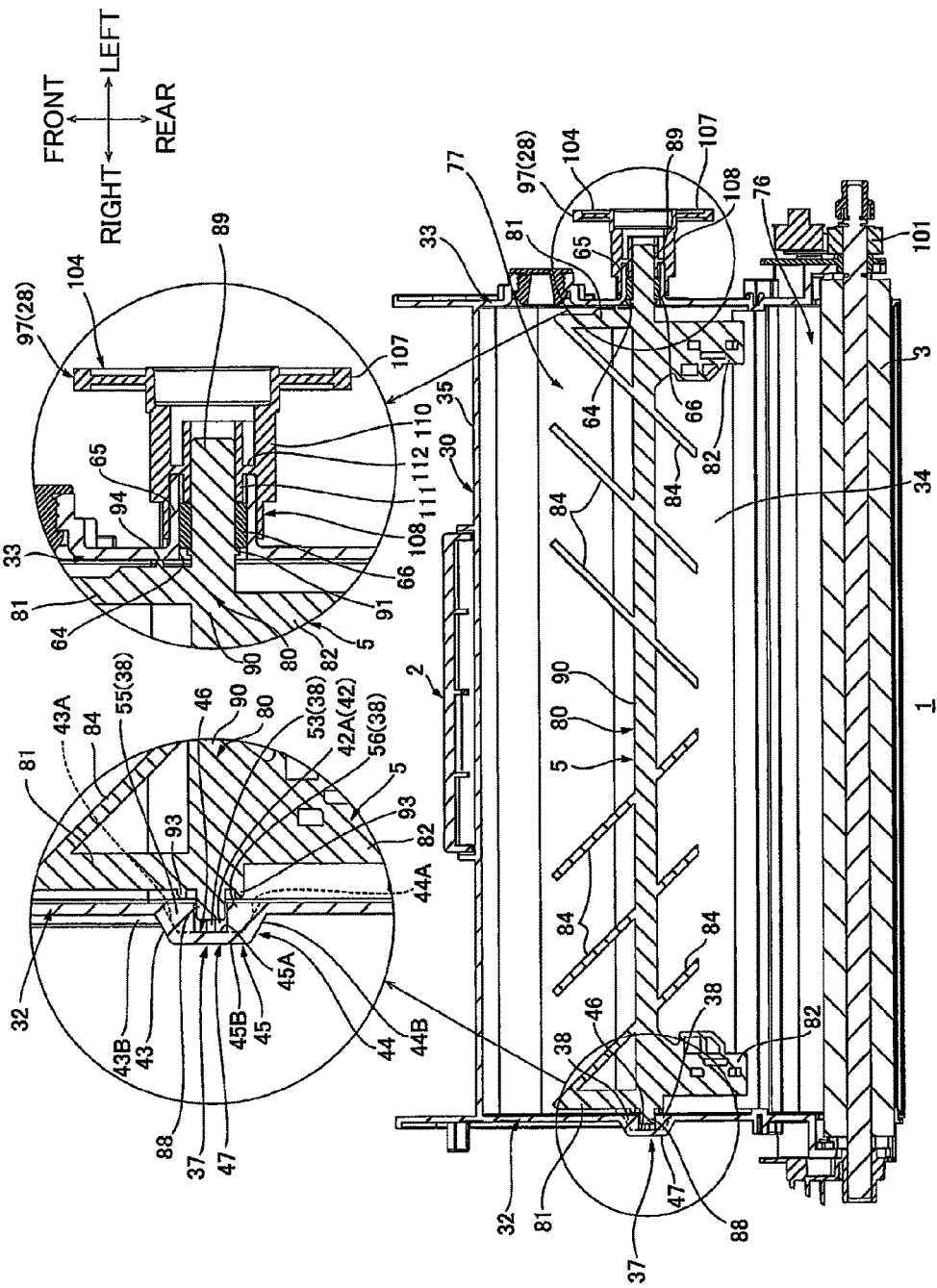
FIG. 9 is a cross-sectional view of the developing cartridge taken along a line B-B in FIG. 7.

As shown in FIGS. 5B and 9, the third wall 43 forms the front wall of the bulged part 37. The third wall 43 is formed continuously between the front edges of the first wall 41 and second wall 42. The third wall 43 has a general plate shape that slopes rearward from the right wall 32 toward the right.

The fourth wall 44 forms the rear wall of the bulged part 37. The fourth wall 44 is formed continuously between the rear edges of the first wall 41 and second wall 42. The fourth wall 44 has a general plate shape that slopes forward from the right wall 32 toward the right.

The fifth wall 45 forms the right wall of the bulged part 37. The fifth wall 45 is connected to the right edges of the first wall 41, the second wall 42, the third wall 43, and the fourth wall 44. The fifth wall 45 has a plate-like shape that is generally rectangular in a side view.

As shown in FIGS. 8 and 9, the inner side of the bulged part 37 constitutes a concave part 46 as an example of a concave portion, while the outer side constitutes a convex part 47 as an example of a convex portion.

More specifically, the concave part 46 is composed of an inner surface 41A of the first wall 41, an inner surface 42A of the second wall 42, an inner surface 43A of the third wall 43, an inner surface 44A of the fourth wall 44, and an inner surface 45A of the fifth wall 45. In other words, the concave part 46 is depressed into the inner surface of the right wall 32 so as to grow narrower toward the right. The concave part 46 has a general trapezoidal shape in a plan view and a front view.

It can also be said that the inner surface 44A of the fourth wall 44 in the concave part 46 slopes leftward toward the rear, i.e., toward the developing roller 3. That is, the inner surface 44A of the fourth wall 44 is an example of a sloped face in the invention.

The convex part 47 is more specifically configured of an outer surface 41B of the first wall 41, an outer surface 42B of the second wall 42, an outer surface 43B of the third wall 43, an outer surface 44B of the fourth wall 44, and an outer surface 45B of the fifth wall 45. That is, the convex part 47 protrudes continuously from the outer surface of the right wall 32 while tapering toward the right. The convex part 47 has a general trapezoidal shape in a plan view and a front view. Put another way, the convex part 47 is sloped so as to approach a first end portion 88 (described later) toward the right.

The continuous surfaces on the convex part 47 that taper toward the right, i.e., the outer surface 41B of the first wall 41, the outer surface 42B of the second wall 42, the outer surface 43B of the third wall 43, and the outer surface 44B of the fourth wall 44, are examples of a peripheral surface. Further, the outer surface 45B of the fifth wall 45 faces rightward and is formed continuously with the right circumferential edges of the connecting surfaces having the outer surface 41B of the first wall 41, outer surface 42B of the second wall 42, outer surface 43B of the third wall 43, and outer surface 44B of the fourth wall 44. The outer surface 45B is an example of an end surface in the invention.

Figure 6A:
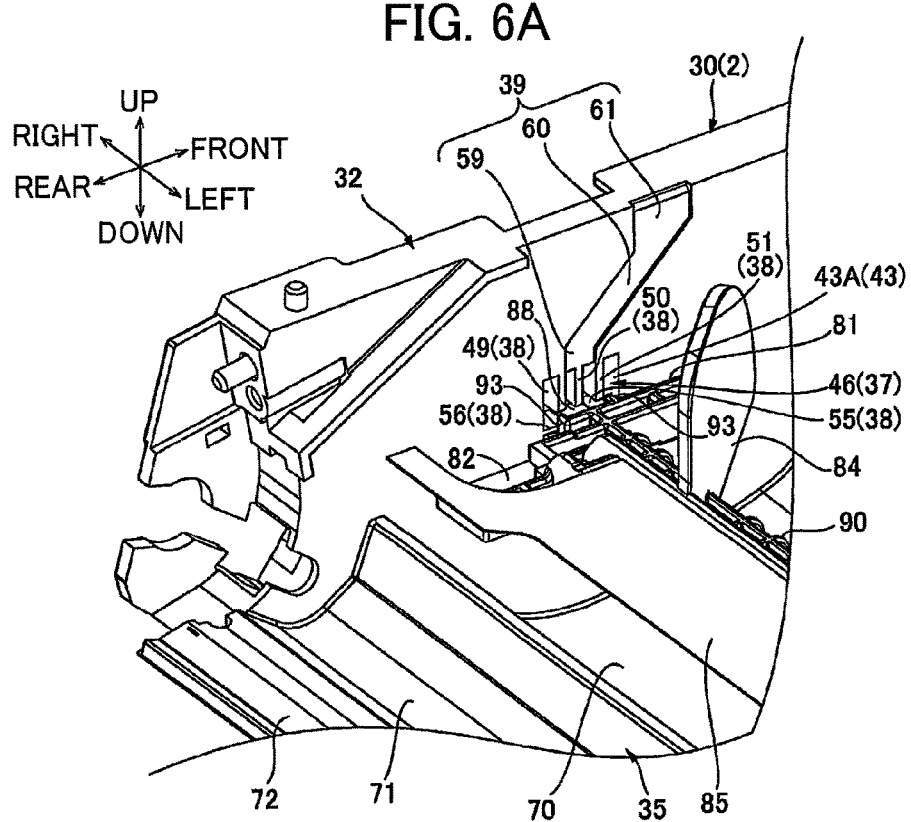
FIG. 6A is a partial perspective view illustrating a state where an agitator is assembled to the rear wall illustrated in FIG. 5A.
Figure 6B:
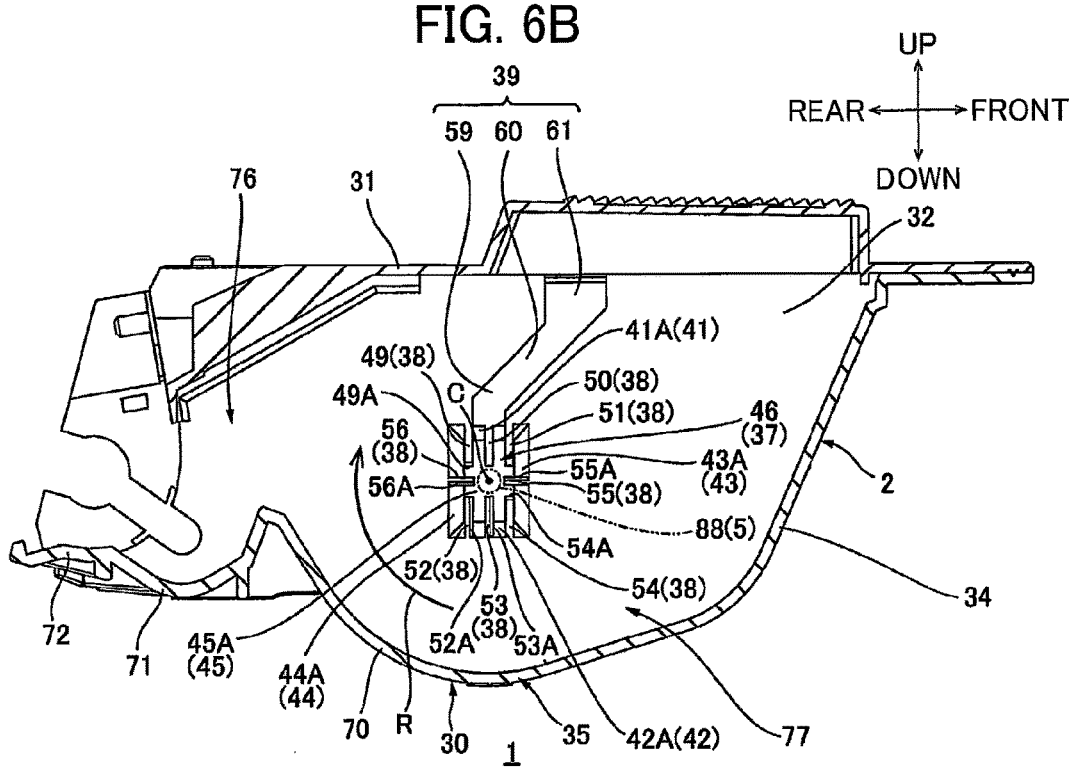
FIG. 6B is a cross-sectional left side view of the right wall illustrated in FIG. 6A, in which a first end portion of a rotational shaft of the agitator is indicated by a two dotted chain line.

As shown in FIGS. 5A and 6B, the eight protruding parts 38 are arranged in the concave part 46 so as to be spaced apart from each other. More specifically, the eight protruding parts 38 includes a first upper protruding part 49, a second upper protruding part 50, a third upper protruding part 51, a first lower protruding part 52, a second lower protruding part 53, a third lower protruding part 54, a front protruding part 55, and a rear protruding part 56.

The first upper protruding part 49 has a plate-like shape that is generally trapezoidal in a front view. The first upper protruding part 49 extends downward from the inner surface 41A of the first wall 41 in a region rearward of its center. The right edge of the first upper protruding part 49 is formed continuously with the inner surface 45A of the fifth wall 45. The left surface of the first upper protruding part 49 extends vertically and is substantially flush with the inner surface of the right wall 32. The bottom surface of the first upper protruding part 49 extends in the left-right direction.

Note that the lower-left corner of the first upper protruding part 49 has been chamfered. The chamfered portion of the first upper protruding part 49 is defined as a chamfered part 49A. The chamfered pert 49A is positioned on the upstream of the first upper protruding part 49 with respect to a rotating direction R of the agitator 5. That is, the chamfered part 49A slopes leftward in a direction from the upstream to the downstream in the rotating direction R of the agitator 5.

The second upper protruding part 50 has a plate-like shape that is generally trapezoidal in a front view. The second upper protruding part 50 extends downward from the inner surface 41A of the first wall 41 at its approximate front-rear center. The right edge of the second upper protruding part 50 is formed continuously with the inner surface 45A of the fifth wall 45, as shown in FIG. 8. The left surface of the second upper protruding part 50 extends vertically and is positioned rightward of the inner surface of the right wall 32. The bottom surface of the second upper protruding part 50 extends in the left-right direction.

As shown in FIGS. 5A and 6B, the third upper protruding part 51 has a plate-like shape that is generally trapezoidal in a front view. The third upper protruding part 51 extends downward from the inner surface 41A of the first wall 41 in a region forward of its center. The right edge of the third upper protruding part 51 is formed continuously with the inner surface 45A of the fifth wall 45. The left surface of the third upper protruding part 51 extends vertically and is substantially flush with the inner surface of the right wall 32. The bottom surface of the third upper protruding part 51 extends in the left-right direction.

With this configuration, the first upper protruding part 49, the second upper protruding part 50, and the third upper protruding part 51 are arranged in the upper portion of the concave part 46 and are spaced at intervals in the front-rear direction. In other words, three of the protruding parts 38 are arranged in the region of the concave part 46 closer to the cover frame 31.

The first lower protruding part 52 is arranged at a position vertically aligned with the first upper protruding part 49. The first lower protruding part 52 has a plate-like shape that is generally trapezoidal in a front view. The first lower protruding part 52 extends upward from the inner surface 42A of the second wall 42 in a region rearward of its center. The right edge of the first lower protruding part 52 is formed continuously with the inner surface 45A of the fifth wall 45. The left surface of the first lower protruding part 52 extends vertically and is substantially flush with the inner surface of the right wall 32. The top surface of the first lower protruding part 52 extends in the left-right direction.

The front-left corner of the first lower protruding part 52 is chamfered across its vertical dimension. The chamfered portion of the first lower protruding part 52 is defined as a chamfered part 52A. The chamfered part 52A is positioned on the upstream side of the first lower protruding part 52 with respect to the rotating direction R of the agitator 5. In other words, the chamfered part 52A slopes leftward along a direction from the upstream to the downstream in the rotating direction R of the agitator 5.

The second lower protruding part 53 is arranged in a position vertically aligned with the second upper protruding part 50. The second lower protruding part 53 has a plate-like shape that is generally trapezoidal in a front view. The second lower protruding part 53 extends upward from the inner surface 42A of the second wall 42 at its approximate front-rear center. As shown in FIG. 8, the right edge of the second lower protruding part 53 is formed continuously with the inner surface 45A of the fifth wall 45. The left surface of the second lower protruding part 53 extends vertically and is substantially flush with the inner surface of the right wall 32. The upper surface of the second lower protruding part 53 extends in the left-right direction.

Note that the front-left edge of the second lower protruding part 53 is chamfered across its vertical dimension, as illustrated in FIGS. 5A and 6B. The chamfered portion of the second lower protruding part 53 is defined as a chamfered part 53A. The chamfered part 53A is positioned on the upstream side of the second lower protruding part 53 in the rotating direction R of the agitator 5. In other words, the chamfered part 53A slopes leftward from the upstream to the downstream in the rotating direction R of the agitator 5.

The third lower protruding part 54 is arranged in a position vertically aligned with the third upper protruding part 51. The third lower protruding part 54 has a plate-like shape that is generally trapezoidal in a front view. The third lower protruding part 54 extends upward from the inner surface 42A of the second wall 42 in a region forward of its center. The right edge of the third lower protruding part 54 is formed continuously with the inner surface 45A of the fifth wall 45. The left surface of the third lower protruding part 54 extends vertically and is substantially flush with the inner surface of the right wall 32. The upper surface of the third lower protruding part 54 extends in the left-right direction.

Note that the upper-left corner of the third lower protruding part 54 is chamfered. This chamfered portion of the third lower protruding part 54 is defined as a chamfered part 54A. The chamfered part 54A is positioned on the upstream side of the third lower protruding part 54 in the rotating direction R of the agitator 5. In other words, the chamfered part 54A slopes leftward from the upstream side to the downstream side in the rotating direction R of the agitator 5.

With this configuration, the first lower protruding part 52, the second lower protruding part 53, and the third lower protruding part 54 are arranged in the lower section of the concave part 46 and are spaced at intervals in the front-rear direction. In other words, three of the protruding parts 38 are arranged in the region of the concave part 46 far from the cover frame 31.

The front protruding part 55 has a plate-like shape that is generally trapezoidal in a plan view. The front protruding part 55 extends rearward from the inner surface 43A of the third wall 43 in a region approximate vertical center of the inner surface 43A. The front protruding part 55 extends to a position overlapping the third upper protruding part 51 and third lower protruding part 54 vertically. As shown in FIG. 9, the right edge of the front protruding part 55 is formed continuously with the inner surface 45A of the fifth wall 45. The left surface of the front protruding part 55 extends in the front-rear direction and is substantially flush with the inner surface of the right wall 32. The rear surface of the front protruding part 55 extends in the left-right direction.

Note that the upper-left edge of the front protruding part 55 is chamfered across its front-rear dimension, as shown in FIGS. 5A and 6B. This chamfered portion of the front protruding part 55 is defined as a chamfered part 55A. The chamfered part 55A is positioned on the upstream side of the front protruding part 55 with respect to the rotating direction R of the agitator 5. That is, the chamfered part 55A slopes leftward from the upstream to the downstream in the rotating direction R of the agitator 5.

The rear protruding part 56 is arranged in a position aligned with the front protruding part 55 in the left-right direction. The rear protruding part 56 has a plate-like shape that is generally trapezoidal in a plan view. The rear protruding part 56 extends forward from the inner surface 44A of the fourth wall 44 in its approximate vertical center region. The rear protruding part 56 extends to a position that overlaps the first upper protruding part 49 and first lower protruding part 52 vertically. As shown in FIG. 9, the right edge of the rear protruding part 56 is formed continuously with the inner surface 45A of the fifth wall 45. The left surface of the rear protruding part 56 extends in the front-rear direction and is substantially flush with the inner surface of the right wall 32. The front surface of the rear protruding part 56 extends in the left-right direction.

Note that the lower-left edge of the rear protruding part 56 is chamfered across its front-rear dimension, as shown in FIGS. 5A and 6B. This chamfered portion of the rear protruding part 56 is defined as a chamfered part 56A. The chamfered part 56A is positioned on the upstream side of the rear protruding part 56 with respect to the rotating direction R of the agitator 5. That is, the chamfered part 56A slopes leftward from the upstream to the downstream in the rotating direction R of the agitator 5.

The guide part 39 is formed at the upper end portion of the right wall 32 at the approximate front-rear center thereof. As shown in FIGS. 5A and 8, the guide part 39 is slightly recessed rightward from the left surface of the right wall 32. The innermost surface of the guide part 39, i.e., the surface of the guide part 39 facing leftward, is substantially flush with the left surface of the second upper protruding part 50. As shown in FIGS. 5A and 6B, the guide part 39 includes a delivery section 59, an intermediate section 60, and a receiving section 61.

The delivery section 59 constitutes the bottom portion of the guide part 39. The delivery section 59 extends upward from the upper end portion of the concave part 46 at the approximate front-rear center thereof.

The intermediate section 60 constitutes the approximate vertical center of the guide part 39. The intermediate section 60 extends diagonally upward and forward from the upper end portion of the delivery section 59. The dimension of the intermediate section 60 along the direction from its lower-front side toward its upper-rear side is approximately equal to the front-rear dimension of the delivery section 59.

The receiving section 61 constitutes the top portion of the guide part 39. The receiving section 61 extends upward from the upper-front end of the intermediate section 60. The front-rear dimension of the receiving section 61 is greater than the dimension of the intermediate section 60 from its lower-front side toward its upper-rear side.

As shown in FIG. 4, the left wall 33 constitutes the left side of the base frame 30 and is arranged to the left of and separated from the right wall 32. The left wall 33 has a plate-like shape that is generally rectangular in a side view and elongated in the front-rear direction. As shown in FIGS. 8 and 9, the left wall 33 includes a through-hole 64, a cylindrical part 65 as an example of a cylindrical portion, and a sealing member 66.

The through-hole 64 is formed in the approximate center of the left wall 33 when viewed from the side so as to be aligned with the bulged part 37 of the right wall 32 in the left-right direction. The through-hole 64 penetrates the left wall 33 and has a general circular shape in a side view.

The cylindrical part 65 has a general cylindrical shape that extends leftward from the peripheral edge of the through-hole 64. The inner diameter of the cylindrical part 65 is approximately equal to the diameter of the through-hole 64.

The sealing member 66 is made from an elastic member, such as a sponge, and has a general cylindrical shape that is elongated in the left-right direction. The sealing member 66 is press-fit into the cylindrical part 65. Consequently, the outer circumferential surface of the sealing member 66 contacts the inner circumferential surface of the cylindrical part 65 with pressure.

As shown in FIGS. 1 and 4, the front wall 34 constitutes the front side of the base frame 30. The front wall 34 bridges the front edges of the right wall 32 and the left wall 33. The front wall 34 has a plate-like shape that is generally rectangular in a front view and elongated in the left-right direction.

The bottom wall 35 constitutes the bottom of the base frame 30. The bottom wall 35 bridges the bottom edges of the right wall 32 and the left wall 33. The front end portion of the bottom wall 35 is connected to the lower end portion of the front wall 34. More specifically, the bottom wall 35 has a curved portion 70, an arc-shaped portion 71, and a lip portion 72.

The curved portion 70 constitutes the front portion of the bottom wall 35. The curved portion 70 is formed continuously with the bottom edge of the front wall 34, extending rearward therefrom. The curved portion 70 curves such that its approximate front-rear center portion is depressed downward.

The arc-shaped portion 71 has a semicircular arc shape in a side view with its concave side facing upward. The inner circumferential surface of the arc-shaped portion 71 conforms to the circumferential surface of the supply roller 4. The front edge of the arc-shaped portion 71 is formed continuously with the rear end portion of the curved portion 70.

The lip portion 72 is formed continuously with the rear end portion of the arc-shaped portion 71, extending diagonally downward and rearward therefrom.

As shown in FIGS. 1 and 4, the cover frame 31 constitutes the top portion of the developing frame 2. The cover frame 31 has a plate-like shape that is generally rectangular in a plan view and elongated in the left-right direction. As shown in FIG. 1, the cover frame 31 is connected to, and specifically is welded to, the top edges of the right wall 32, the left wall 33, and the front wall 34. The rear edge of the cover frame 31 is positioned diagonally upward and forward from the rear edge of the bottom wall 35.

As shown in FIG. 1, a communication opening 75 is defined by the rear end portion of the cover frame 31, the upper end portion of the bottom wall 35 at the connecting portion of the curved portion 70 and arc-shaped portion 71, the left surface of the right wall 32, and the right surface of the left wall 33.

The developing frame 2 has a developing section 76 and a toner-accommodating section 77. More specifically, the region in the developing frame 2 rear of the communication opening 75 is defined as the developing section 76, while the region in the developing frame 2 front of the communication opening 75 is defined as the toner-accommodating section 77.

The developing section 76, the developing frame 2 rotatably supports the developing roller 3 and supply roller 4 described above. Further, the developing frame 2 supports the thickness-regulating blade 6 in the upper rear portion of the developing section 76.

The toner-accommodating section 77 accommodates toner therein. Further, the developing frame 2 rotatably supports the agitator 5 in the toner-accommodating section 77.

(2) Agitator

Figure 10A:
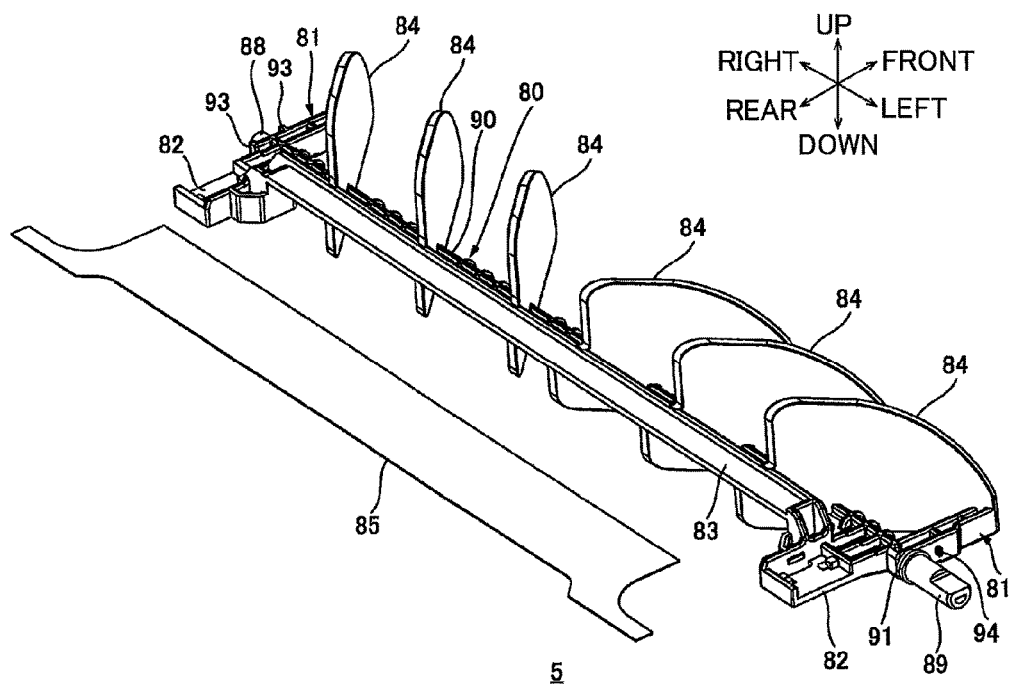
FIG. 10A is an exploded perspective view of the agitator illustrated in FIG. 4.
Figure 10B:
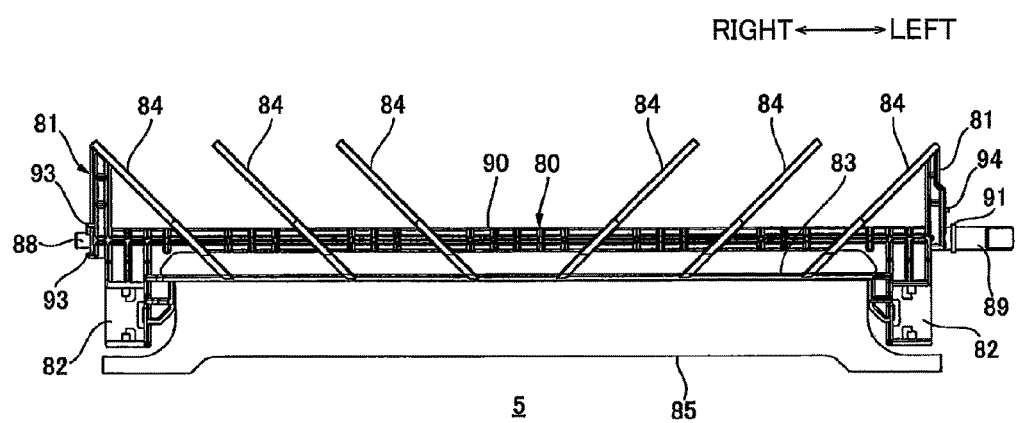
FIG. 10B is a plan view of the agitator illustrated in FIG. 4.
Figure 11:
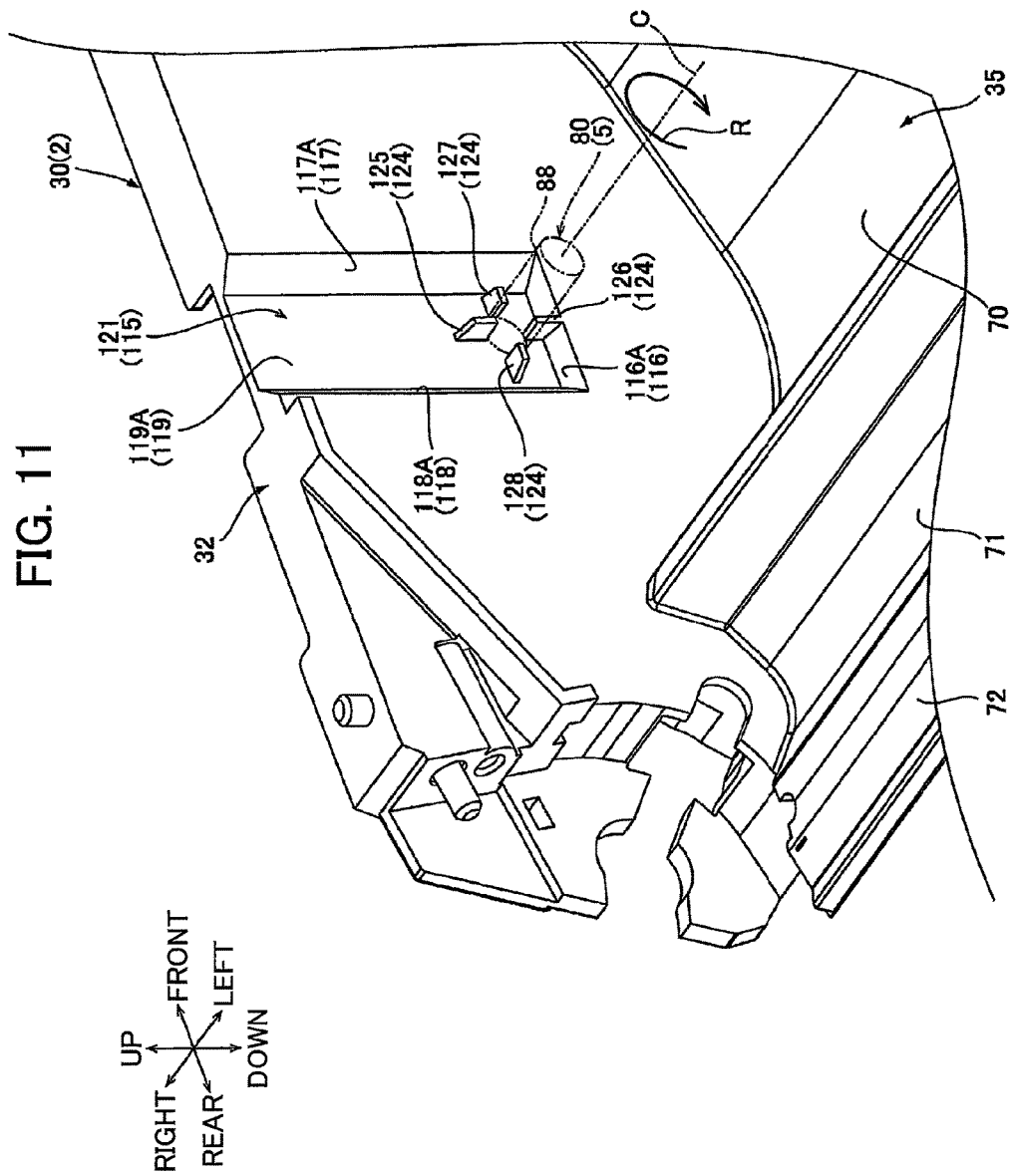
FIG. 11 is a partial perspective view of a developing cartridge according to a second embodiment and particularly illustrating a right wall of a developing frame as viewed from left and rear side.

As shown in FIGS. 1 and 9, the agitator 5 is accommodated in the toner-accommodating section 77. As shown in FIGS. 10A and 10B, the agitator 5 integrally includes a rotational shaft 80, a pair of reinforcing parts 81, a pair of arm parts 82, a connecting part 83, and six agitating blades 84. The agitator 5 also includes a circulating blade 85.

The rotational shaft 80 has a general columnar shape that extends in the left-right direction and is centered on a rotational center C. The rotational shaft 80 has a first end portion 88, a second end 89, and a center portion 90.

The first end portion 88 constitutes the right end of the rotational shaft 80. As shown in FIGS. 8 and 9, the first end portion 88 is inserted into the concave part 46 and supported by the protruding parts 38.

More specifically, the diameter of the first end portion 88 is slightly smaller than the gap formed between the bottom surface of the second upper protruding part 50 and the top surface of the second lower protruding part 53. Further, the diameter of the first end portion 88 is slightly smaller than the gap formed between the rear surface of the front protruding part 55 and the front surface of the rear protruding part 56. As shown in FIG. 8, the first end portion 88 is arranged such that its top side faces the bottom surface of the second upper protruding part 50, while its bottom side faces the top surface of the second lower protruding part 53. Further, as shown in FIG. 9, the front side of the first end portion 88 faces the rear surface of the front protruding part 55, while the rear side of the first end portion 88 faces the front surface of the rear protruding part 56.

With this construction, the first end portion 88 is received in the concave part 46 and is rotatably supported within the eight protruding parts 38 by the second upper protruding part 50, the second lower protruding part 53, the front protruding part 55, and the rear protruding part 56, as illustrated in FIGS. 6A and 6B. That is, the second upper protruding part 50, second lower protruding part 53, front protruding part 55, and rear protruding part 56 are arranged at 90 degree intervals from each other along the rotating direction R of the rotational shaft 80 and centered on the rotational center C, as depicted in the side view of FIG. 6B. Thus, the second upper protruding part 50, second lower protruding part 53, front protruding part 55, and rear protruding part 56 extend in a radial pattern around the rotational center C.

Further, the second upper protruding part 50, the second lower protruding part 53, the front protruding part 55, the rear protruding part 56, the first upper protruding part 49, the third upper protruding part 51, the first lower protruding part 52, and the third lower protruding part 54 are arranged at intervals along the rotating direction R of the agitator 5 when viewed from the side. Namely the eight protruding parts 38 that support the first end portion 88 are arranged at intervals along the rotating direction R.

As shown in FIGS. 10A and 10B, the second end 89 constitutes the left end of the rotational shaft 80. As shown in FIGS. 8 and 9, the second end 89 is supported in the left wall 33 by inserting the second end 89 into the cylindrical part 65 so that it contacts the inner surface of the sealing member 66 with pressure. The second end 89 slides against the sealing member 66 when the agitator 5 rotates. The second end 89 is also provided with a circumferential rib 91.

The circumferential rib 91 is provided around the right end portion of the second end 89. The circumferential rib 91 protrudes radially outward from the circumference of the second end 89, forming a general annular shape that extends in the circumferential direction of the second end 89. The outer diameter of the circumferential rib 91 is greater than the diameter of the rotational shaft 80 and the inner diameter of the sealing member 66, but smaller than the inner diameters of the through-hole 64 and cylindrical part 65. The left surface of the circumferential rib 91 is in contact with the right surface of the sealing member 66.

The center portion 90 constitutes the entire portion of the rotational shaft 80 excluding the first end portion 88 and the second end 89, i.e., the left-right center segment of the rotational shaft 80.

As shown in FIGS. 10A and 10B, the reinforcing parts 81 are disposed with one on each of the left and right ends of the center portion 90. The reinforcing parts 81 have a general squared columnar shape and protrude radially outward from the center portion 90. The right reinforcing part 81 includes a pair of ribs 93, while the left reinforcing part 81 includes a boss 94.

The ribs 93 are arranged one on either side of the first end portion 88 in a radial direction of the rotational shaft 80. The ribs 93 protrude rightward from the right surface of the right reinforcing part 81.

The boss 94 protrudes leftward from the left surface of the left reinforcing part 81 at the radial mid-portion of the same.

The arm parts 82 are arranged on the left-right inside of the corresponding reinforcing parts 81. The arm parts 82 have a plate-like shape and protrude in a radial direction from the center portion 90 toward the side opposite the reinforcing parts 81.

The connecting part 83 has a plate-like shape and extends in the left-right direction. The connecting part 83 is connected to each of the arm parts 82 at a mid-portion in the radial direction of the rotational shaft 80.

The six agitating blades 84 are arranged at intervals in the left-right direction. The agitating blades 84 have a plate-like shape that is similar to a fan shape and extend from the center portion 90 of the rotational shaft 80 along a direction that intersects the axial direction of the rotational shaft 80. One end of each agitating blade 84 is connected to the connecting part 83, while the other end extends toward the side of the center portion 90 opposite the connecting part 83. More specifically, the three agitating blades 84 on the right side are slanted toward the right reinforcing part 81 while moving away from the connecting part 83. Note that the end of the rightmost agitating blade 84 farthest from the connecting part 83 is connected to the outer radial end portion of the right reinforcing part 81. Further, the three agitating blades 84 on the left side are slanted toward the left reinforcing part 81 while moving in a direction away from the connecting part 83. Note that the end of the leftmost agitating blade 84 farthest from the connecting part 83 is connected to the outer radial end portion of the left reinforcing part 81.

The circulating blade 85 is a separate member from the rotational shaft 80, the reinforcing parts 81, the arm parts 82, the connecting part 83, and the agitating blades 84 described above. The circulating blade 85 is formed of a flexible film material, such as polyethylene terephthalate (PET). The circulating blade 85 has a general rectangular shape that is elongated in the left-right direction. The circulating blade 85 is supported on the connecting part 83 by fixing one edge of the circulating blade 85 to the connecting part 83.

(3) Drive Unit

Figure 7:
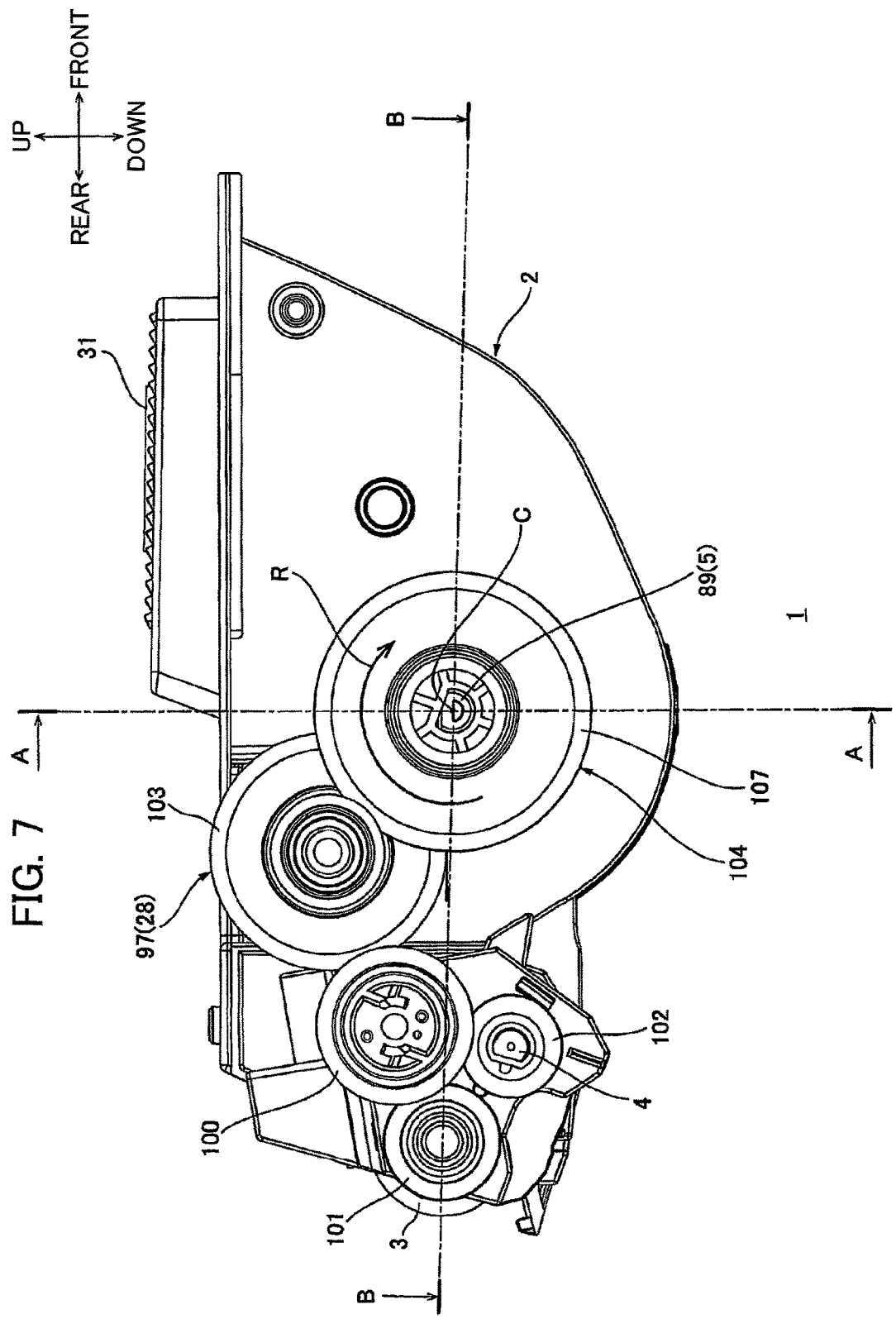
FIG. 7 is a left side view of the developing cartridge in which a gear cover is removed.

As shown in FIGS. 3 and 7, the drive unit 28 is arranged on the left side of the developing cartridge 1. The drive unit 28 includes a gear train 97, and a gear cover 98.

As shown in FIGS. 7 and 8, the gear train 97 includes a coupling 100 into which a drive force from a drive source (not shown) is inputted, a developing gear 101 that is engaged with the coupling 100 for transmitting a drive force from the coupling 100 to the developing roller 3, a supply gear 102 that is engaged with the coupling 100 for transmitting a drive force from the coupling 100 to the supply roller 4, an idle gear 103 that is engaged with the coupling 100 and rotatably supported on the left wall 33 of the developing frame 2, and an agitator gear 104 that is engaged with the idle gear 103 for transmitting a drive force from the idle gear 103 to the agitator 5. Note that a detailed description of the gears in the gear train 97 other than the agitator gear 104 is not provided herein.

The agitator gear 104 is disposed on the left end portion of the developing frame 2. The agitator gear 104 includes a gear part 107 and a bearing part 108.

The gear part 107 is disposed on the left end portion of the agitator gear 104. The gear part 107 has a general cylindrical shape. Gear teeth are provided around the entire circumferential surface of the gear part 107.

As shown in FIG. 8, the bearing part 108 includes an outer circumferential part 110, an inner circumferential part 111, and a connecting part 112.

The outer circumferential part 110 has a general cylindrical shape and extends rightward from the right surface of the gear part 107. The outer diameter of the outer circumferential part 110 is smaller than the outer diameter of the gear part 107. The inner diameter of the outer circumferential part 110 is approximately equal to the outer diameter of the cylindrical part 65.

The inner circumferential part 111 is arranged inside of and separated from the outer circumferential part 110. The inner circumferential part 111 has a general cylindrical shape that is elongated in the left-right direction. The right end of the inner circumferential part 111 is positioned leftward of the right end of the outer circumferential part 110. The outer diameter of the inner circumferential part 111 is approximately equal to the inner diameter of the cylindrical part 65. The inner diameter of the inner circumferential part 111 is approximately equal to the outer diameter of the second end 89 constituting the rotational shaft 80.

The connecting part 112 is connected to the approximate left-right center of the outer circumferential part 110 and the approximate left-right center of the inner circumferential part 111.

The agitator gear 104 is assembled on the agitator 5 with the outer circumferential part 110 receiving the cylindrical part 65 so that the cylindrical part 65 is rotatable relative to the inner circumferential part 111, and the inner circumferential part 111 receiving the second end 89 of the agitator 5 so that the second end 89 is not rotatable relative to the inner circumferential part 111.

The inner circumferential part 111 presses the sealing member 66 rightward so that the sealing member 66 contacts the left end of the circumferential rib 91. The connecting part 112 is in contact with the left end of the cylindrical part 65. With this configuration, the agitator gear 104 presses the agitator 5 rightward and fixes the left-right position of the agitator 5 within the toner-accommodating section 77.

The gear cover 98 has a frame-like structure with a closed bottom and closed left side. The gear cover 98 covers the left side of the gear train 97, including the agitator gear 104.

4. Rotation of Agitator

When a drive force is inputted into the coupling 100 from a drive source (not shown), the drive force is transmitted to the agitator gear 104 via the idle gear 103, causing the agitator 5 to rotate about the rotational center C in the rotating direction R of the agitator 5, as illustrated in FIGS. 1 and 6B.

By rotating, the agitator 5 conveys toner from the toner-accommodating section 77 to the developing section 76 through the communication opening 75. In other words, the agitator 5 conveys toner rearward from the toner-accommodating section 77 toward the developing roller 3.

While toner in the toner-accommodating section 77 also enters the concave part 46 at this time, the toner can be scraped out of the concave part 46 in a direction diagonally leftward and rearward since the inner surface 44A of the fourth wall 44 is sloped leftward toward the rear, i.e., is sloped leftward along the direction from the agitator 5 toward the developing roller 3.

Similarly, toner that enters the concave part 46 can be scraped diagonally upward and leftward since the inner surface 41A of the first wall 41 is sloped leftward toward the top; can be scraped diagonally downward and leftward since the inner surface 42A of the second wall 42 is sloped leftward toward the bottom; and can be scraped diagonally leftward and forward since the inner surface 43A of the third wall 43 is sloped leftward toward the front.

Moreover, toner in the concave part 46 can be more efficiently scraped out since the first upper protruding part 49, the first lower protruding part 52, the second lower protruding part 53, the third lower protruding part 54, the front protruding part 55, and the rear protruding part 56 among the eight protruding parts 38 have chamfered parts that slope leftward in a direction from the upstream to the downstream in the rotating direction R of the agitator 5.

The agitator 5 may occasionally move slightly in the left-right direction within the toner-accommodating section 77 as the agitator 5 rotates, the developing cartridge 1 is dropped, and the like.

When the agitator 5 moves slightly rightward, the pair of ribs 93 on the right reinforcing part 81 contact the left surfaces of the eight protruding parts 38.

Similarly, when the agitator 5 moves slightly leftward, the boss 94 on the left reinforcing part 81 contacts the right surface of the left wall 33.

5. Effect of Embodiment (1) According to the developing cartridge 1 of the preferred embodiment, the first end portion 88 of the rotational shaft 80 constituting the agitator 5 is positioned inside the concave part 46 formed in the right wall 32. Further, the first end portion 88 is supported by the eight protruding parts 38 that are arranged at intervals from each other in the rotating direction R of the agitator 5.

In other words, the first end portion 88 of the rotational shaft 80 is positioned apart from the inner surface of the concave part 46 in radial directions of the rotational shaft 80.

Since gaps are formed between the first end portion 88 and the inner surface of the concave part 46 along radial directions of the rotational shaft 80, toner that enters the concave part 46 flows outward and is scraped out of the concave part 46 by the rotating agitator 5.

Consequently, this construction reduces the amount of toner that collects in the concave part 46. Hence, even when the toner is low-melting-temperature toner this configuration reduces the amount of toner that melts and adheres to the inner surface of the concave part 46 due to friction generated by the rotating agitator 5.

(2) As shown in FIGS. 6A and 8, the inner ends of the eight protruding parts 38 do not protrude farther leftward than the right wall 32. Accordingly, the circulating blade 85 may be constructed to extend all the way to the inner surface of the right wall 32 without having to avoid the protruding parts 38. Therefore, the agitator 5 can effectively agitate toner in the toner-accommodating section 77 of the developing frame 2.

(3) Further, the first end portion 88 of the rotational shaft 80 in the developing cartridge 1 described above can be reliably supported by eight protruding parts 38, as illustrated in FIG. 6B.

(4) Further, since the protruding parts 38 extend radially about the rotational center C of the rotational shaft 80, as shown in FIG. 6B, the protruding parts 38 can support the first end portion 88 with stability.

(5) Further, this developing cartridge 1 can be provided with at least four protruding parts 38, as illustrated in FIG. 6B.

(6) As shown in FIG. 6B, the first end portion 88 can be supported with greater stability by providing four protruding parts 38, and specifically the second upper protruding part 50, the second lower protruding part 53, the front protruding part 55, and the rear protruding part 56 at 90 degree intervals in the rotating direction R of the agitator 5 about the rotational center C of the rotational shaft 80, as shown in FIG. 6B.

(7) In the developing cartridge 1 of the embodiment, toner flowing into the concave part 46 flows along the inner surface 44A of the fourth wall 44 where it can be scraped out toward the developing roller 3, as illustrated in FIGS. 6B and 9. Accordingly, the developing cartridge 1 can reduce the amount of toner collecting in the concave part 46 and can reliably convey toner toward the developing roller 3.

(8) As shown in FIGS. 5B and 9, the circumferential surfaces of the convex part 47 that protrudes rightward from the right wall 32. Specifically the outer surface 41B of the first wall 41, the outer surface 42B of the second wall 42, the outer surface 43B of the third wall 43, and the outer surface 44B of the fourth wall 44 form obtuse angles with the outer surface 45B of the fifth wall 45. Accordingly, an operator can safely grip the developing cartridge 1.

(9) As illustrated in FIGS. 5A and 6A, the agitator 5 can be assembled in the base frame 30 while the cover frame 31 is separated from the base frame 30. Accordingly, the agitator 5 can be easily assembled in the developing frame 2.

(10) As illustrated in FIGS. 6A and 6B, the first end portion 88 of the rotational shaft 80 is guided by the guide part 39, enabling the agitator 5 to be reliably mounted in the base frame 30.

Further, three of the protruding parts 38 are arranged in the region of the concave part 46 that is on the cover frame 31 side of the rotational shaft 80. Accordingly, the gaps between adjacent protruding parts 38 in the front-rear direction, the gap between the protruding parts 38 and the inner surface 44A of the fourth wall 44, and the gap between the protruding parts 38 and the inner surface 43A of the third wall 43 can be set smaller than in a configuration having two or less protruding parts 38.

Thus, this configuration can reduce the possibility of the first end portion 88 of the rotational shaft 80 entering the front-rear gaps between neighboring protruding parts 38 in the region of the concave part 46 on the cover frame 31 side of the rotational shaft 80 or the front-rear gaps between the protruding parts 38 and the inner surfaces of the concave part 46, when the agitator 5 is mounted in the base frame 30. As a result, the first end portion 88 of the rotational shaft 80 can be reliably guided by the guide part 39 and disposed in the center of the eight protruding parts 38 so as to be supported by the eight protruding parts 38.

(11) As shown in FIGS. 5A and 6B, three of the protruding parts 38 are disposed in the area of the concave part 46 on the side of the rotational shaft 80 opposite the cover frame 31. Hence, the gaps between neighboring protruding parts 38 in the front-rear direction, the gap between the protruding parts 38 and the inner surface 44A of the fourth wall 44, and the gap between the protruding parts 38 and the inner surface 43A of the third wall 43 can be set smaller than a configuration having two or less protruding parts 38.

Accordingly, the structure of the embodiment can more reliably reduce the chance of the first end portion 88 on the rotational shaft 80 entering the front-rear gaps between adjacent protruding parts 38 in the region of the concave part 46 on the side of the rotational shaft 80 opposite the cover frame 31 or entering the front-rear gaps between the protruding parts 38 and the inner surfaces of the concave part 46 when the agitator 5 is mounted in the base frame 30, even if the position of the first end portion 88 becomes offset toward the region of the concave part 46 farther from the cover frame 31.

(12) By providing the circumferential rib 91 on the agitator 5 to the right of the sealing member 66, as illustrated in FIGS. 8 and 9, toner in the toner-accommodating section 77 of the developing frame 2 can be suppressed from entering between the sealing member 66 and second end 89. This reduces the likelihood of toner becoming melted and adhering to regions between the sealing member 66 and second end 89 due to friction generated by the rotating agitator 5.

(13) The circumferential rib 91 protruding radially from the second end 89 contacts the sealing member 66, as illustrated in FIGS. 8 and 9. This construction increases the contact area at which the rotational shaft 80 of the agitator 5 rotates with respect to the sealing member 66. Accordingly, this arrangement can more reliably reduce the amount of toner that leaks between the sealing member 66 and the rotational shaft 80 of the agitator 5. Thus, this construction can more reliably decrease the likelihood of toner being melted and adhering to regions between the sealing member 66 and second end 89 due to friction generated by the rotating agitator 5.

(14) Since the diameter of the through-hole 64 is substantially equal to the inner diameter of the cylindrical part 65, there is no unevenness produced between the periphery of the right wall 32 defining the through-hole 64 and the inner surface of the cylindrical part 65. Accordingly, this arrangement can reduce the amount of toner that collects in the cylindrical part 65 when toner passes through the through-hole 64 and enters the cylindrical part 65. Since this arrangement reduces the amount of toner that collects inside the cylindrical part 65, this construction also reduces the amount of toner that is melted and adheres to the interior of the cylindrical part 65 due to friction from the rotating agitator 5.

6. Second Embodiment

A cartridge according to a second embodiment will be described while referring to the accompanying drawings wherein like parts and components are designated by the same reference numerals to avoid duplicating description.

In the first embodiment described above, the developing frame 2 is provided with the bulged part 37 and the eight protruding parts 38 disposed in the approximate center region of the right wall 32 when viewed from the side. The bulged part 37 has a general squared cylindrical shape that is closed on the right side and protrudes rightward from the right wall 32 while tapering toward the right. In a plan view and a front view, the bulged part 37 has a general trapezoidal shape.

In contrast, the developing frame 2 according to the second embodiment is provided with a bulged part 115 and four protruding parts 124. The bulged part 115 extends from the general center region of the right wall 32 in a side view to the top edge of the right wall 32 and protrudes rightward from the right wall 32. The bulged part 115 has a box-like shape tapering toward the left and closed on the right side, and is open on the top.

The bulged part 115 has a first wall 116, a second wall 117, a third wall 118, and a fourth wall 119.

The first wall 116 forms the bottom wall of the bulged part 115. The first wall 116 has a general plate shape that slopes upward from the right wall 32 toward the right.

The second wall 117 forms the front wall of the bulged part 115. The second wall 117 extends upward from the front edge of the first wall 116 to the top edge of the right wall 32. The second wall 117 has a general plate shape that slopes rearward from the right wall 32 toward the right.

The third wall 118 forms the rear wall of the bulged part 115. The third wall 118 extends upward from the rear edge of the first wall 116 to the top edge of the right wall 32. The third wall 118 has a general plate shape that slopes forward from the right wall 32 toward the right.

The fourth wall 119 configures the right wall of the bulged part 115. The fourth wall 119 is connected to the right edges of the first wall 116, the second wall 117, and the third wall 118 and extends upward to the top edge of the right wall 32. The fourth wall 119 has a plate-like shape that is generally rectangular in a side view.

The inner side of the bulged part 115 constitutes a concave part 121.

More specifically, the concave part 121 is configured of an inner surface 116A of the first wall 116, an inner surface 117A of the second wall 117, an inner surface 118A of the third wall 118, and an inner surface 119A of the fourth wall 119. In other words, the concave part 121 is depressed into the inner surface of the right wall 32 while tapering toward the right. The concave part 121 has a general trapezoidal shape in a plan view and a front view.

It can also be said that in the concave part 121 the inner surface 118A of the third wall 118 slopes leftward toward the rear, i.e., toward the developing roller 3. That is, the inner surface 118A of the third wall 118 is an example of the sloped face.

The four protruding parts 124 are arranged in the concave part 121 so as to be spaced apart from each other. More specifically, the four protruding parts 124 include a top protruding part 125, a bottom protruding part 126, a front protruding part 127, and a rear protruding part 128.

The top protruding part 125 is disposed above the first end portion 88 of the rotational shaft 80. The top protruding part 125 has a plate-like shape that is generally trapezoidal in a front view and protrudes leftward from the inner surface 119A of the fourth wall 119 at a position in the approximate vertical center thereof. The left surface of the top protruding part 125 extends vertically and is substantially flush with the inner surface of the right wall 32. The bottom surface of the top protruding part 125 extends in the left-right direction. The top surface of the top protruding part 125 slopes downward toward the left.

The bottom protruding part 126 is disposed below the first end portion 88 of the rotational shaft 80. The bottom protruding part 126 has a general trapezoidal shape in a front view and extends upward from the inner surface 116A of the first wall 116 in the general front-rear center region thereof. The right edge of the bottom protruding part 126 is formed continuously with the inner surface 119A. The left surface of the bottom protruding part 126 extends vertically and is substantially flush with the inner surface of the right wall 32. The top surface of the bottom protruding part 126 extends in the left-right direction.

The front protruding part 127 is disposed forward from the front side of the first end portion 88 of the rotational shaft 80. The front protruding part 127 has a plate-like shape that is generally trapezoidal in a plan view and protrudes leftward from the inner surface 119A of the fourth wall 119. The left surface of the front protruding part 127 extends in the front-rear direction and is substantially flush with the inner surface of the right wall 32. The rear surface of the front protruding part 127 extends in the left-right direction. The front surface of the front protruding part 127 slopes rearward toward the left.

The rear protruding part 128 is disposed rearward from the first end portion 88 of the rotational shaft 80. The rear protruding part 128 has a plate-like shape that is generally trapezoidal in a plan view and protrudes leftward from the inner surface 119A of the fourth wall 119. The left surface of the rear protruding part 128 extends in the front-rear direction and is substantially flush with the inner surface of the right wall 32. The front surface of the rear protruding part 128 extends in the left-right direction. The rear surface of the rear protruding part 128 slopes frontward toward the left.

With this construction, the first end portion 88 of the rotational shaft 80 constituting the agitator 5 is received in the concave part 121 and is rotatably supported by the four protruding parts 124. The top protruding part 125, bottom protruding part 126, front protruding part 127, and rear protruding part 128 are arranged at 90-degree intervals from each other along the rotating direction R of the agitator 5. Thus, the top protruding part 125, bottom protruding part 126, front protruding part 127, and rear protruding part 128 extend in a radial pattern around the rotational center C.

Further, the top protruding part 125, bottom protruding part 126, front protruding part 127, and rear protruding part 128 supporting the first end portion 88 of the rotational shaft 80 are arranged at intervals along the rotating direction R of the agitator 5.

The arrangement described above in the second embodiment can obtain the same operational advantages as those described above for the first embodiment.

While the description has been made in detail with reference to specific embodiments thereof, it would be apparent to those skilled in the art that various changes and modifications may be made therein without departing from the spirit and scope of the above described embodiments.

The eight protruding parts 38 provided in the developing cartridge 1 of the first embodiment may be configured similarly to the second upper protruding part 50 described above in the first embodiment, such that the left surfaces of the protruding parts 38 are positioned rightward from the inner surface of the right wall 32. That is, the left surfaces of the eight protruding parts 38 may be positioned farther from the left wall 33 than the inner surface of the right wall 32 is to the left wall 33.

Further, the number of protruding parts 38 is not limited to eight, but may be a number greater than or less than eight.

In the first embodiment described above, three of the protruding parts 38 are arranged in the region of the concave part 46 close to the cover frame 31, while three of the protruding parts 38 are arranged in the region of the concave part 46 far from the cover frame 31. However, it is also possible to dispose just one protruding part 38 in the region of the concave part 46 far from the cover frame 31.

Further, while the protruding parts 38 in the first embodiment described above have a rectangular shape when viewed in the axial direction of the agitator 5, the shape of the protruding parts 38 viewed in the axial direction of the agitator may be circular instead.

In the first embodiment described above, the bulged part 37 protrudes rightward from the right wall 32 while tapering toward the right and has a general trapezoidal shape in a plan view and a front view. However, the bulged part 37 need not be tapered toward the right and may have a general rectangular shape in a plan view and a front view.

The developing roller 3, supply roller 4, and agitator 5 in the above embodiments may be supported in the developing frame 2 through bearing members or the like, or may be supported directly by the developing frame 2 without the use of such bearing members and the like.

Alternatively, the developing roller 3 may have a developing roller shaft passing through its rotational center that is supported in the developing frame 2, or may have flanges provided on the left and right ends of a hollow roller that are supported in the developing frame 2.

What is claimed is:
1. A cartridge comprising:
  a casing configured to accommodate developing agent, the casing having a first wall and a second wall disposed away from the first wall in a first direction;
  a developing roller; and an agitator comprising:
- a rotational shaft extending in the first direction and having a first end portion and a second end portion, the first end portion defining a circumferential surface and an end surface, the first end portion being supported by the first wall, the second end portion being supported by the second wall, the rotational shaft being configured to rotate in a rotating direction about a rotational center and defining a radial direction perpendicular to the first direction, the first wall having a concave portion recessed away from the second wall in the first direction so as to receive the first end portion, the concave portion defined by a first inner surface, a second inner surface, a third inner surface, a fourth inner surface and a fifth inner surface, the first end portion of the rotational shaft being positioned between the first inner surface and the second inner surface, the first end portion of the rotational shaft being positioned between the third inner surface and the fourth inner surface, the fifth inner surface facing the end surface of the rotational shaft;
- a plurality of protruding portions protruding from the fifth inner surface of the concave portion in the first direction, the plurality of protruding portions extending toward the circumferential surface in the radial direction, the plurality of protruding portions being arranged at intervals from each other in the rotating direction; and
- an agitating blade positioned between the first end portion and the second end portion in the first direction and extending in the radial direction.

2. The cartridge according to claim 1, wherein the first wall has an inner surface facing the second wall in the first direction; and
   wherein each of the plurality of protruding portions has an inner end flush with the inner surface.

3. The cartridge according to claim 1, wherein the first wall has an inner surface facing the second wall in the first direction; and
   wherein each of the plurality of protruding portions has an inner end farther from the second wall in the first direction than the inner surface is to the second wall.

4. The cartridge according to claim 1, wherein the plurality of protruding portions extend radially with respect to the rotational center.

5. The cartridge according to claim 1, wherein a total number of the plurality of protruding portions is at least four.

6. The cartridge according to claim 5, wherein the plurality of protruding portions are arranged at 90 degree intervals from each other in the rotating direction with respect to the rotational center when viewed in the first direction.

7. The cartridge according to claim 1, wherein the concave portion has a sloped face closer to the developing roller than the first end portion is to the developing roller, the sloped face being sloped toward the second wall in a direction from the first end portion to the developing roller.

8. The cartridge according to claim 7, wherein the first wall has an outer surface facing opposite to the second wall in the first direction, the first wall having a convex portion conforming to the concave portion and protruding opposite to the second wall from the outer surface in the first direction, the convex portion having a peripheral surface continuous from the outer surface and an end surface continuous from the peripheral surface, the end surface facing opposite to the second wall in the first direction, the peripheral surface sloped toward the first end portion in a direction from the second wall to the outer surface.

9. The cartridge according to claim 1, wherein the casing further comprises:
   a first frame having the first wall and the second wall, and
   a second frame connected to the first frame in a second direction perpendicular to the first direction.

10. The cartridge according to claim 9, wherein the first wall is disposed between the concave portion and the second frame and has a guide portion extending in the second direction; and
    wherein at least three of the plurality of protruding portions are disposed in a region of the concave portion close to the second frame with respect to the rotational shaft.

11. The cartridge according to claim 9, wherein at least three of the plurality of protruding portions are disposed in a region of the concave portion far from the second frame with respect to the rotational shaft.

12. The cartridge according to claim 9, wherein the second wall forms a through-hole penetrating the second wall in the first direction such that the second end portion is inserted in the through-hole, the second wall has a cylindrical portion extending in the first direction around the through-hole;
    wherein the agitator has a circumferential rib positioned in the cylindrical portion and having a diameter larger than that of the rotational shaft; and
    wherein the first frame has a sealing member press-fit into the cylindrical portion and positioned farther from the first wall in the first direction than the circumferential rib is to the first wall.

13. The cartridge according to claim 12, wherein the sealing member has an inner face facing the first wall in the first direction, the inner face contacting with the circumferential rib.

14. The cartridge according to claim 12, wherein the cylindrical portion has an inner diameter; and
    wherein the through-hole defines a diameter generally equal to the inner diameter.

* * * * *